US012739259B2

(12) United States Patent
Nanivadekar et al.

(10) Patent No.: US 12,739,259 B2
(45) Date of Patent: Sep. 15, 2026

(54) MULTI-ENGINE INTRUSION DETECTION SYSTEM

(71) Applicant: VMware, Inc., Palo Alto, CA (US)

(72) Inventors: Mandar Nanivadekar, Pune (IN); Paraskumar Prajapati, Gujarat (IN)

(73) Assignee: VMware LLC, Palo Alto, CA (US)

( * ) Notice: Subject to any disclaimer, the term of this patent is extended or adjusted under 35 U.S.C. 154(b) by 518 days.

(21) Appl. No.: 18/204,352

(22) Filed: May 31, 2023

(65) Prior Publication Data

US 2024/0314141 A1 Sep. 19, 2024

(30) Foreign Application Priority Data

Mar. 13, 2023 (IN) ............................ 202341016579

(51) Int. Cl.
*H04L 9/40* (2022.01)
*G06F 9/455* (2018.01)

(52) U.S. Cl.
CPC ...... *H04L 63/1416* (2013.01); *G06F 9/45558* (2013.01); *G06F 2009/45587* (2013.01)

(58) Field of Classification Search
CPC ............... H04L 63/1416; G06F 4/5558; G06F 2009/45587
See application file for complete search history.

(56) References Cited

U.S. PATENT DOCUMENTS

2013/0139245 A1* 5/2013 Thomas .................. H04L 47/32 726/13
2018/0205651 A1* 7/2018 Lentczner ............... H04L 45/74

FOREIGN PATENT DOCUMENTS

JP 2004/179999 A * 6/2004
WO WO20150160331 * 10/2015 ............ H04L 12/26

* cited by examiner

*Primary Examiner* — Paul E Callahan
(74) *Attorney, Agent, or Firm* — Kim & Stewart LLP

(57) ABSTRACT

Example methods and systems for multi-engine intrusion detection are described. In one example, a computer system may configure a set of multiple intrusion detection system (IDS) engines that include at least a first IDS engine and a second IDS engine. In response to detecting establishment of a first packet flow and a second packet flow, the computer system may assign the first packet flow to the first IDS engine and second packet flow to the second engine based on an assignment policy. This way, first packet flow inspection may be performed using the first IDS engine to determine whether first packet(s) associated with the first packet flow are potentially malicious. Second packet flow inspection may be performed using the second IDS engine to determine whether second packet(s) associated with the second packet flow are potentially malicious.

18 Claims, 9 Drawing Sheets

410
Multi-engine IDS
(e.g., XDR) enabled

420
Compile
IDS DB

430
Compilation
success?

Y

N

440
Send DB blob to
IDS network kernel driver

450
Create and initialize multiple IDS
engines{ENGINE-i}, i=1,…,N
based on limit and user's input 460
Acquired shared spin lock
(exclusive/writer mode)

470
Update global IDS pointer
to object associated with
ENGINE-i

480
Release shared spin lock

490
Update status

EXIT

MULTI-ENGINE INTRUSION DETECTION SYSTEM

CROSS-REFERENCE TO RELATED APPLICATION

The present application claims priority to, and the benefits of, Indian Provisional Application No. 202341016579 filed on Mar. 13, 2023, the content of which is incorporated herein by reference.

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., host). Each VM is generally provisioned with virtual resources to run a guest operating system and applications. The virtual resources may include central processing unit (CPU) resources, memory resources, storage resources, network resources, etc. In practice, it is desirable to detect potential security threats that may affect the performance of hosts and VMs in the SDDC.

DETAILED DESCRIPTION

Figure 1:
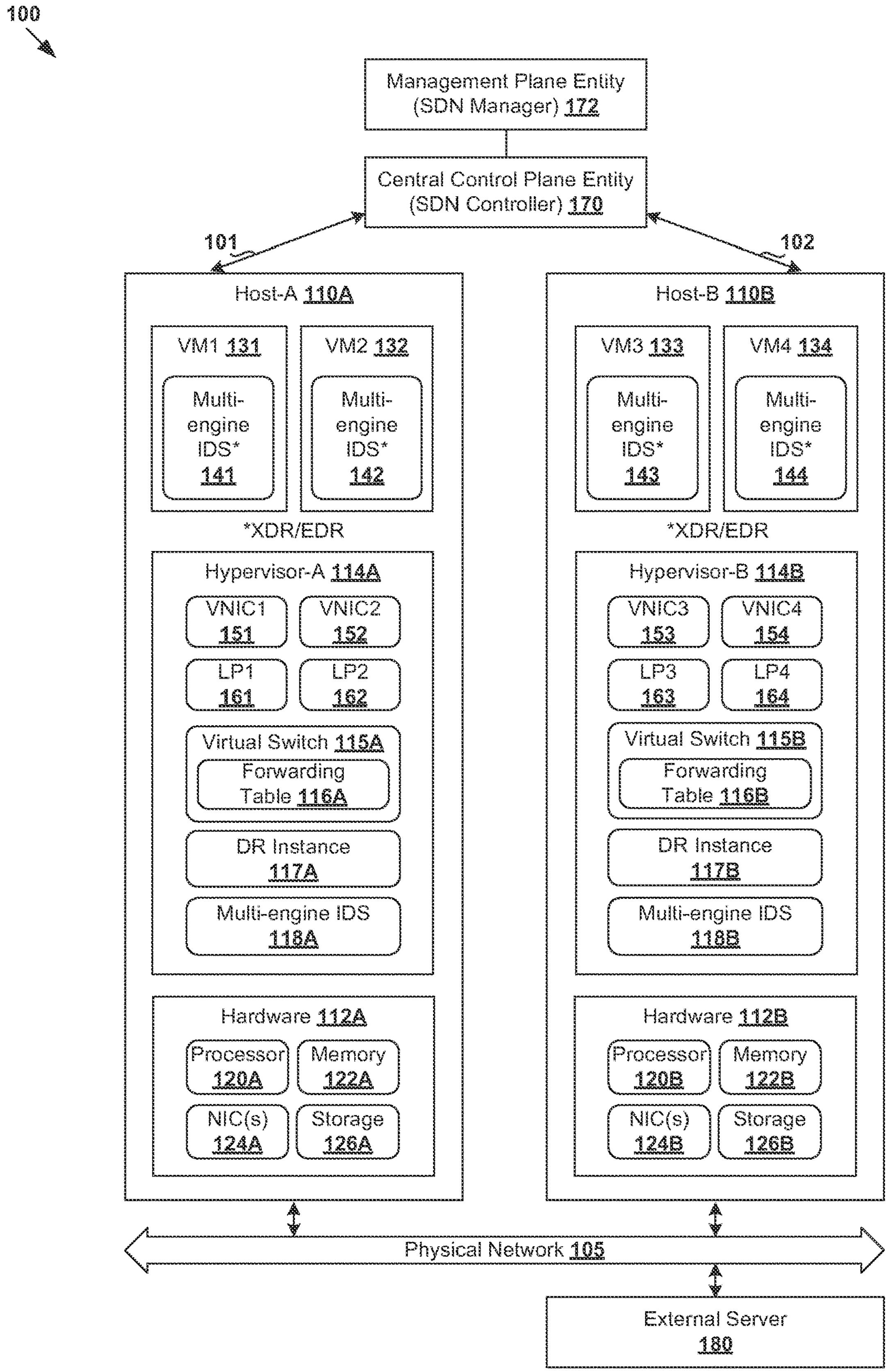
FIG. 1 is a schematic diagram illustrating an example software-defined networking (SDN) environment in which multi-engine intrusion detection may be performed.

According to examples of the present disclosure, intrusion detection may be improved using a multi-engine intrusion detection system (IDS). In one example, a computer system may configure a set of multiple IDS engines that include at least a first IDS engine and a second IDS engine. In response to detecting an establishment of a first packet flow associated with an endpoint, the computer system may assign the first packet flow to the first IDS engine based on an assignment policy. In response to detecting an establishment of a second packet flow associated with the endpoint, the computer system may assign the second packet flow to the second IDS engine based on the assignment policy.

The computer system may perform, using the first IDS engine, first packet flow inspection to determine whether first packet(s) associated with the first packet flow are potentially malicious based on a set of IDS signatures. Further, the computer system may perform, using the second IDS engine, second packet flow inspection to determine whether second packet(s) associated with the second packet flow are potentially malicious based on the set of IDS signatures. Using examples of the present disclosure, multiple packet flows may be inspected more efficiently using the set of multiple IDS engines (e.g., see 210 in FIG. 2).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Physical Implementation View

FIG. 1 is a schematic diagram illustrating example software-defined networking (SDN) environment 100 in which multi-engine intrusion detection may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

SDN environment 100 includes multiple hosts 110A-B that are inter-connected via physical network 105. Each host 110A/110B may include suitable hardware 112A/112B and virtualization software (e.g., hypervisor-A 114A, hypervisor-B 114B) to support various virtual machines (VMs). For example, hosts 110A-B may support respective VMs 131-134. Hardware 112A/112B includes suitable physical components, such as central processing unit(s) or processor(s) 120A/120B; memory 122A/122B; physical network interface controllers (NICs) 124A/124B; and storage disk(s) 126A/126B. Note that SDN environment 100 may include any number of hosts (also known as a "host computers", "host devices", "physical servers", "server systems", "transport nodes," etc.), where each host may be supporting tens or hundreds of VMs.

Hypervisor 114A/114B maintains a mapping between underlying hardware 112A/112B and virtual resources allocated to respective VMs. Virtual resources are allocated to respective VMs 131-134 to support a guest operating system and application(s) that are not shown for simplicity. Any suitable applications may be implemented, such as user-space and/or kernel-space processes/applications. For example, virtual resources may include virtual CPU, guest physical memory, virtual disk, virtual network interface controller (VNIC), etc. Hardware resources may be emulated using virtual machine monitors (VMMs). For example, VNICs 151-154 are virtual network adapters for respective VMs 131-134. Each VNIC may be emulated by a corresponding VMM (not shown) instantiated by hypervisor 114A/114B.

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports 161-164 are associated with respective VMs 131-134. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual extensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 on host-A 110A and VM3 133 on host-B 110B may be connected to the same logical switch and located on the same logical layer-2 segment, such as a segment with virtual network identifier (VNI)=6000.

SDN controller 170 and SDN manager 172 are example network management entities in SDN environment 100. One example of an SDN controller is the NSX controller component of VMware NSX® (available from VMware, Inc.) that operates on a central control plane. SDN controller 170 may be a member of a controller cluster (not shown for simplicity) that is configurable using SDN manager 172 operating on a management plane. Network management entity 170/172 may be implemented using physical machine(s), VM(s), or both. Logical switches, logical routers, and logical overlay networks may be configured using SDN controller 170, SDN manager 172, etc. To send or receive control information, a local control plane (LCP) agent (not shown) on host 110A/110B may interact with SDN controller 170 via control-plane channel 101/102. Hosts 110A-B may also maintain data-plane connectivity with each other via physical network 105 to facilitate communication among VMs 131-134. Hypervisor 114A/114B may implement a virtual tunnel endpoint (VTEP) (not shown) to encapsulate and decapsulate packets with an outer header identifying the relevant logical overlay network (e.g., VNI).

Multi-Engine Intrusion Detection System (IDS)

One of the challenges in SDN environment 100 is improving the overall data center security. According to examples of the present disclosure, a multi-engine IDS may be implemented to detect potentially malicious activities in a more efficient and/or scalable manner. As used herein, the term "malicious," "malicious activity," "malware" or "security threat" may be used as an umbrella term to cover hostile or intrusive software, including but not limited to botnets, viruses, worms, Trojan horse programs, spyware, phishing, adware, riskware, rootkits, spams, scareware, ransomware, or any combination thereof. Examples of the present disclosure may facilitate automated threat detection, remediation, and response to reduce system downtime due to security threats and malicious attacks.

Depending on the desired implementation, examples of the present disclosure may be implemented as part of any suitable data center security solution(s), such as endpoint detection and response (EDR), extended detection and response (XDR), security information and event management (SIEM), etc. One example is VMware Carbon Black (available from VMware Inc.). In practice, EDR is a security solution for monitoring endpoints (e.g., VMs, user devices) to detect and respond to potentially malicious activities. XDR is designed to address the shortcomings of existing technologies such as EDR and SIEM that may not detect some threats effectively. XDR combines EDR telemetry with data from other sources, such as network, e-mail, identity and access management.

In the case of XDR, for example, a latency is introduced in each network operation due to various reasons, such as the number of intrusion detection signatures to be matched, size of packets being analyzed, the number of events and alerts generated from a packet, internal locking mechanisms due to processing of multiple packets in parallel, number of parallel connections on each endpoint or workload that results in multiple packets arriving at multiple CPU cores and further stressing the XDR system, etc. The latencies introduced may range between 50 and 520 microseconds (ms), and possibly more in the future. This may lead to network throughput degradation, increased dropped packets and connections, and longer application response time. In this case, system performance may be affected, and user experience hindered, which is undesirable.

(a) Example Computer System

According to examples of the present disclosure, multi-engine intrusion detection may be implemented to improve the efficiency of security monitoring, such as using XDR, EDR, or similar. Depending on the desired implementation, multi-engine intrusion detection may be implemented by endpoint(s) and/or hypervisor on a particular host. In the endpoint-implemented approach, VMs 131-134 may each implement a multi-engine IDS (see 141-144 in FIG. 1). Alternatively or additionally, a hypervisor-implemented approach may be used by configuring a multi-engine IDS (see 118A-B in FIG. 1) on hypervisors 114A/114B on host 110A/110B.

Figure 2:
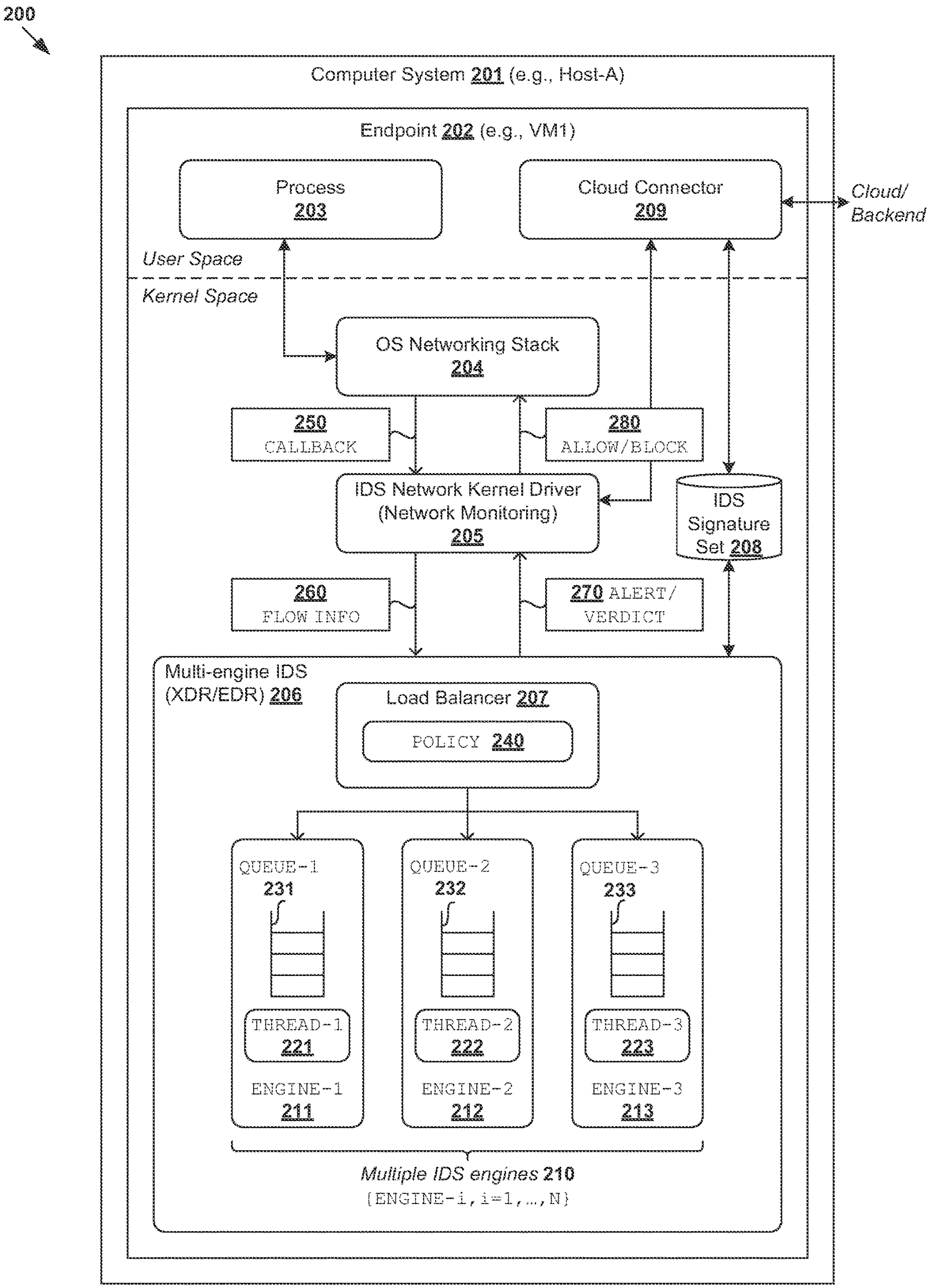
FIG. 2 is a schematic diagram illustrating an example computer system to perform multi-engine intrusion detection.

One endpoint-implemented example for multi-engine IDS is shown in FIG. 2, which is a schematic diagram illustrating example computer system for multi-engine intrusion detection 200 in SDN environment 100. In the example in FIG. 2, host-A 110A in FIG. 1 may be used as an example "computer system" (see 201), and VM1 131 as an example "endpoint," "workload" or "virtualized computing instance" (see 202). In practice, note that endpoint 202 may be a VM, container, physical machine, etc. In the example in FIG. 2, endpoint 202 may be a VM supporting any suitable user-space application or process 203 (one shown for simplicity) whose network traffic may be monitored using OS networking stack 204, IDS network kernel driver 205 and multi-engine IDS 206.

During packet flow inspection, OS networking stack 204 may be configured to notify IDS network kernel driver 205 of any incoming and/or outgoing packet flow(s). IDS network kernel driver 205 may in turn pass the packet flow (or associated information) to multi-engine IDS 206 for inspection, such as by matching packet content (e.g., header and/or payload information) against multiple signatures in IDS signature set 208. In the case of a potential match, multi-engine IDS 206 may generate and send an alert (or verdict) to notify IDS network kernel driver 205, which may in turn instruct OS networking stack 204 to allow or block the flow. See 250-270 in FIG. 2.

To improve efficiency according to examples of the present disclosure, multi-engine IDS 206 may include multiple (N) IDS engines 210 that are each denoted as ENGINE-i for i=1, . . . , N. For simplicity, an example case of N=3 is shown in FIG. 2, where first IDS engine 211, second IDS engine 212 and third IDS engine 213 are configured on endpoint 202. Each IDS engine 211/212/213 may be associated with queue 221/222/223 (denoted as QUEUE-i) to receive or store flow inspection requests and worker thread 231/232/233 (denoted as THREAD-i) to process those requests by performing signature matching. Multi-engine IDS 206 may further include load balancer 207 to direct requests to IDS engines 211-213 based on any suitable policy 240. The content of IDS signature set 208 may be updated periodically via cloud connector 209.

In at least some embodiments of the present disclosure, network intrusion detection may be performed using multi-engine IDS 206 in a substantially lock-free manner. For example, each IDS engine 211/212/213 may be implemented using a single thread to reduce the likelihood of, or avoid, incurring additional latencies due to synchronization locks among multiple IDS engines and respective CPU cores. Examples of the present disclosure may be implemented to reduce the likelihood of network throughput degradation due to network intrusion detection, while substantially maintaining detection efficacy and application response time.

(b) Example Process

The example in FIG. 2 will be discussed using FIG. 3, which is a flowchart of example process 300 for a computer system to perform multi-engine intrusion detection. Example process 300 may include one or more operations, functions, or actions illustrated by one or more blocks, such as 310 to 360. The various blocks may be combined into fewer blocks, divided into additional blocks, and/or eliminated depending on the desired implementation.

Figure 3:
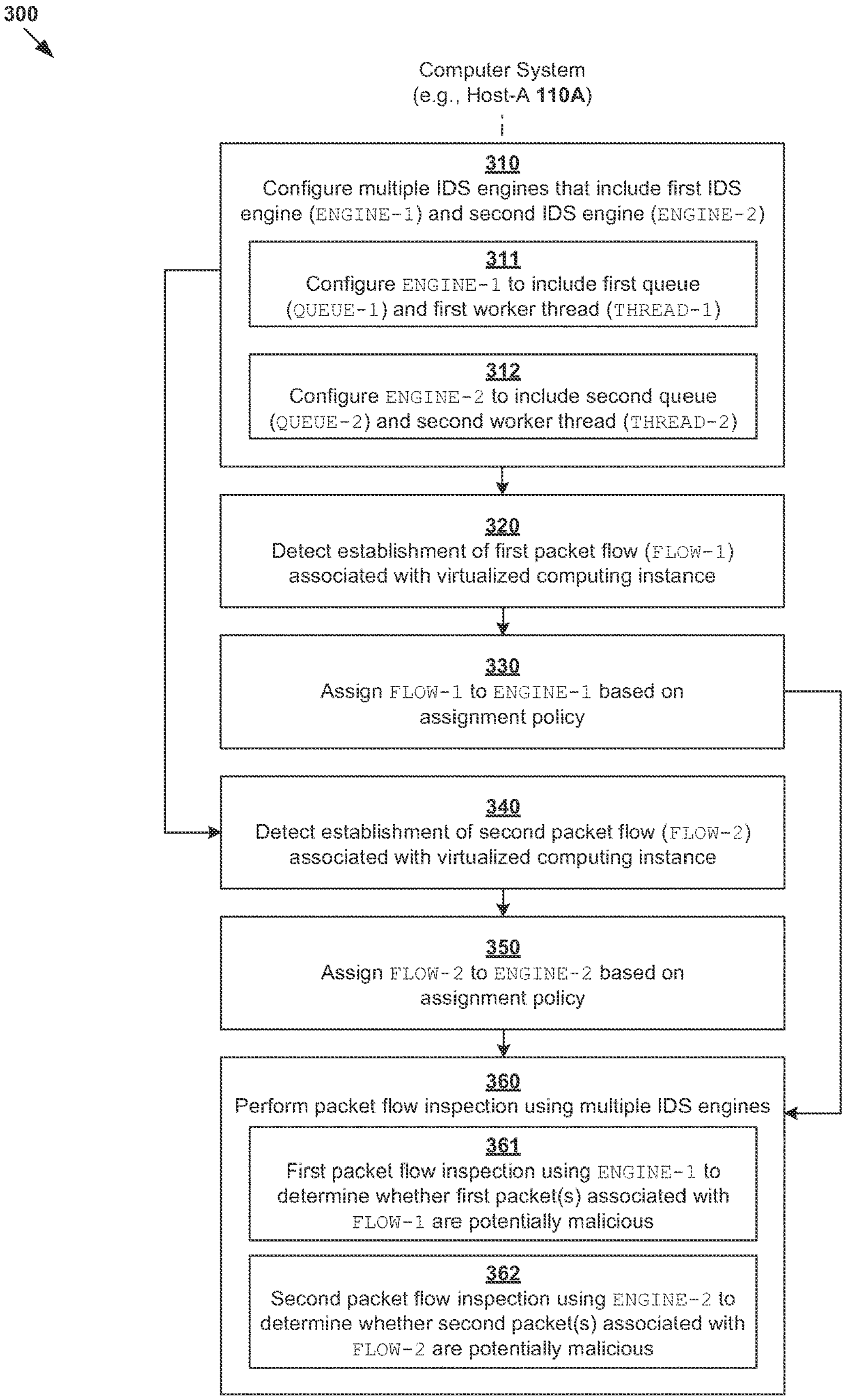
FIG. 3 is a flowchart of an example process for a computer system to perform multi-engine intrusion detection.

At 310 in FIG. 3, computer system 201 may configure multiple IDS engines 210 that include at least first IDS engine 211 and second IDS engine 212. In the example in FIG. 2, first IDS engine 211 (ENGINE-1) may be configured to include (a) a first queue 231 (QUEUE-1) to store first request(s) associated with the first packet flow inspection, and (b) a first worker thread 221 (THREAD-1) to process the first request(s). Second IDS engine 212 (ENGINE-2) may be configured to include (a) a second queue 232 (QUEUE-2) to store second request(s) associated with the second packet flow inspection, and (b) a second worker thread 222 (THREAD-2) to process the second request(s). See 311-312 in FIG. 3.

In practice, an "IDS engine" may also be referred to as an "IDS container instance," "IDS engine instance," etc. In the case of XDR implementation, IDS engines 211-213 may also be referred to as "XDR engines" or "XDR engine instances." In the case of EDR implementation, IDS engines 211-213 may also be referred to as "EDR engines" or "EDR engine instances." The term "engine" or "instance" may refer generally to any suitable hardware and/or software (e.g., computer program, code, computer-readable instructions, etc.) capable of inspecting or processing packets for intrusion detection according to examples of the present disclosure.

At 320-330 in FIG. 3, in response to detecting an establishment of a first packet flow associated with endpoint 202, computer system 201 (e.g., IDS network kernel driver 205)

may assign the first packet flow to first IDS engine 211 based on an assignment policy (see 240 in FIG. 2) associated with the multiple IDS engines 210.

At 340-350 in FIG. 3, in response to detecting an establishment of a second packet flow associated with endpoint 202, computer system 201 (e.g., IDS network kernel driver 205) may assign the second packet flow to second IDS engine 212 based on an assignment policy (see 240 in FIG. 2) associated with the multiple IDS engines 210. Using the example in FIG. 1, the first packet flow may be between first endpoint=VM1 131 on host-A 110A and second endpoint=VM4 134 on host-B 110B or external endpoint/server 180 located on an external network accessible via an edge appliance, for example. Any additional packet flow may be assigned to third IDS engine 213 for inspection and intrusion detection.

At 360 in FIG. 3, computer system 201 may perform packet flow inspection using multiple IDS engines 210 to improve efficiency. At 361, first packet flow inspection may be performed using first IDS engine 211 to determine whether first packet(s) associated with the first packet flow are potentially malicious by matching first packet(s) against signature set 208. Second packet flow inspection may be performed using second IDS engine 212 to determine whether second packet(s) associated with the second packet flow are potentially malicious by matching second packet(s) against signature set 208.

Using examples of the present disclosure, the configuration of multi-engine IDS 206 helps to speed up the inspection of multiple packet flows, such as endpoint 202 having parallel connections that results in the arrival of multiple packets belonging to different packet flows. In at least some embodiments (to be explained using FIGS. 5-7), each ENGINE-i may be configured to be single-threaded (i.e., single thread of execution) to facilitate substantially lock-free processing. For example, once a packet flow is assigned to ENGINE-i, request(s) associated with the packet flow inspection may be stored in QUEUE-i for subsequent processing by THREAD-i. This way, multiple IDS engines 206 may perform packet flow inspection independently in a substantially lock-free manner to reduce, if not avoid, latencies due to synchronization locking.

Examples of the present disclosure should be contrasted against conventional approaches that rely on a single engine with a single queue during the inspection of multiple packet flows. In this case, lock synchronization is required for multiple CPU cores to access the same queue. Also, packets that belong to the same packet flow may be inspected by different CPU cores. During high network usage, it has been observed that such conventional approaches may cause a drop in network throughput and/or number of connections, as well as an increase in application response time. In this case, some conventional approaches may address such issues by dropping packets and reducing efficacy or accept performance penalties.

Further, as will be explained using FIGS. 5-7, the likelihood of a lock contention between IDS network kernel driver 205 and THREAD-i may be reduced to improve efficiency and reduce latencies. In this case, in response to detecting packet(s) associated with a packet flow, IDS network kernel driver 205 may acquire a lock associated with QUEUE-i to queue request(s) in QUEUE-i. During packet inspection, THREAD-i of ENGINE-i may acquire the lock to associated with QUEUE-i, generate a snapshot associated with QUEUE-i, release the lock, and process request(s) in the snapshot in a substantially lock-free manner. This way, IDS network kernel driver 205 may continue to queue more request(s) in QUEUE-i, while THREAD-i of ENGINE-i is free to process request(s) in the snapshot. Various examples will be described below.

Example Configuration

Figure 4:
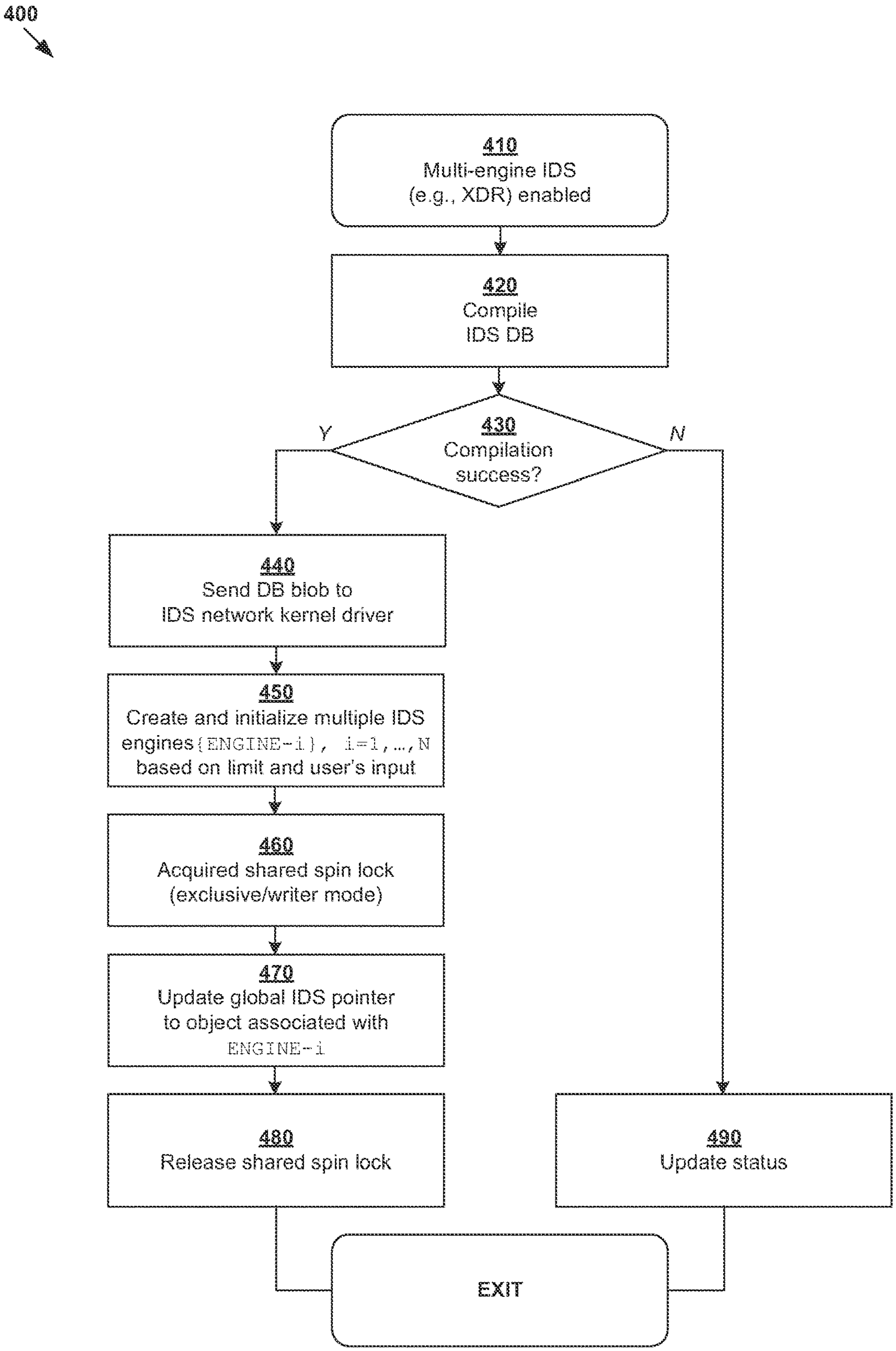
FIG. 4 is a flowchart of an example detailed process for a computer system to configure multi-engine intrusion detection system (IDS)

FIG. 4 is a flowchart of example detailed process 400 for a computer system to configure multi-engine IDS. Example process 400 may include one or more operations, functions, or actions illustrated at 410 to 490. The various operations, functions or actions may be combined into fewer blocks, divided into additional blocks, and/or eliminated depending on the desired implementation. Using the example in FIG. 2, multi-engine IDS 206 may be configured or enabled on endpoint 202 supported by computer system 201.

(a) Signature Set

At 410-420 in FIG. 4, in response to enablement or activation of multi-engine IDS on computer system 201, a database of IDS signatures may be compiled. At 430-440, if compilation is successful, a resulting database blob may be sent to IDS network kernel driver 205. Otherwise (see 490), a status update is performed and process 400 ends. In the example in FIG. 2, database in the form of IDS signature set 208 may store a set of multiple (M) IDS signatures denoted as $S_j$, j=1, . . . , M. Each IDS signature (S)) may specify (a) match fields to be matched to a packet's content and (b) corresponding matching signature.

For a particular signature ($S_j$), its match fields may be compared against packet content in the form of header information, payload information, metadata derivable from the packet, or any combination thereof. Header information may include packet flow tuples, such as source IP address (SIP), destination IP address (DIP), source port number (SPN), destination port number (DPN) and protocol (PRO). A matching signature may be associated with any suitable attributes, such as signature ID, signature name, attack pattern, severity level, etc. Database 208 may be updated at any suitable frequency via cloud connector 209 implemented by endpoint 202.

(b) Multiple IDS Engines

At 450 in FIG. 4, multiple (N) IDS engines 210 denoted as ENGINE-i for i=1, . . . , N may be created and initialized (i.e., configured). As shown in the example in FIG. 2, ENGINE-i may be configured to include a dedicated queue (QUEUE-i) to store I/O requests associated with a packet flow assigned to ENGINE-i, and worker thread (THREAD-i) to process I/O requests in QUEUE-i. Each THREAD-i may represent a single thread of execution (to be contrasted against multiple threads within one engine). The number of IDS engines (N) configured may be based on any suitable user-configurable value, which is limited by the number of processors or CPU cores accessible by endpoint 202. When IDS engines 210 are initialized, necessary event handling mechanisms may be registered for various events, such as detecting potential malware, or accepting any decoded metadata such as transport layer security (TLS) metadata, hypertext transfer protocol (HTTP) metadata, etc.

At 460-470 in FIG. 4, a shared spin lock (exclusive/write mode) is acquired to update a global pointer to multi-engine IDS 206. Note that the lock is acquired to update the global IDS pointer such that multiple (N) IDS engines 210 are available for subsequent packet flow inspection. At 480, the shared spin lock is released and process 400 ends.

Example IDS Engine Assignment

Figure 5:
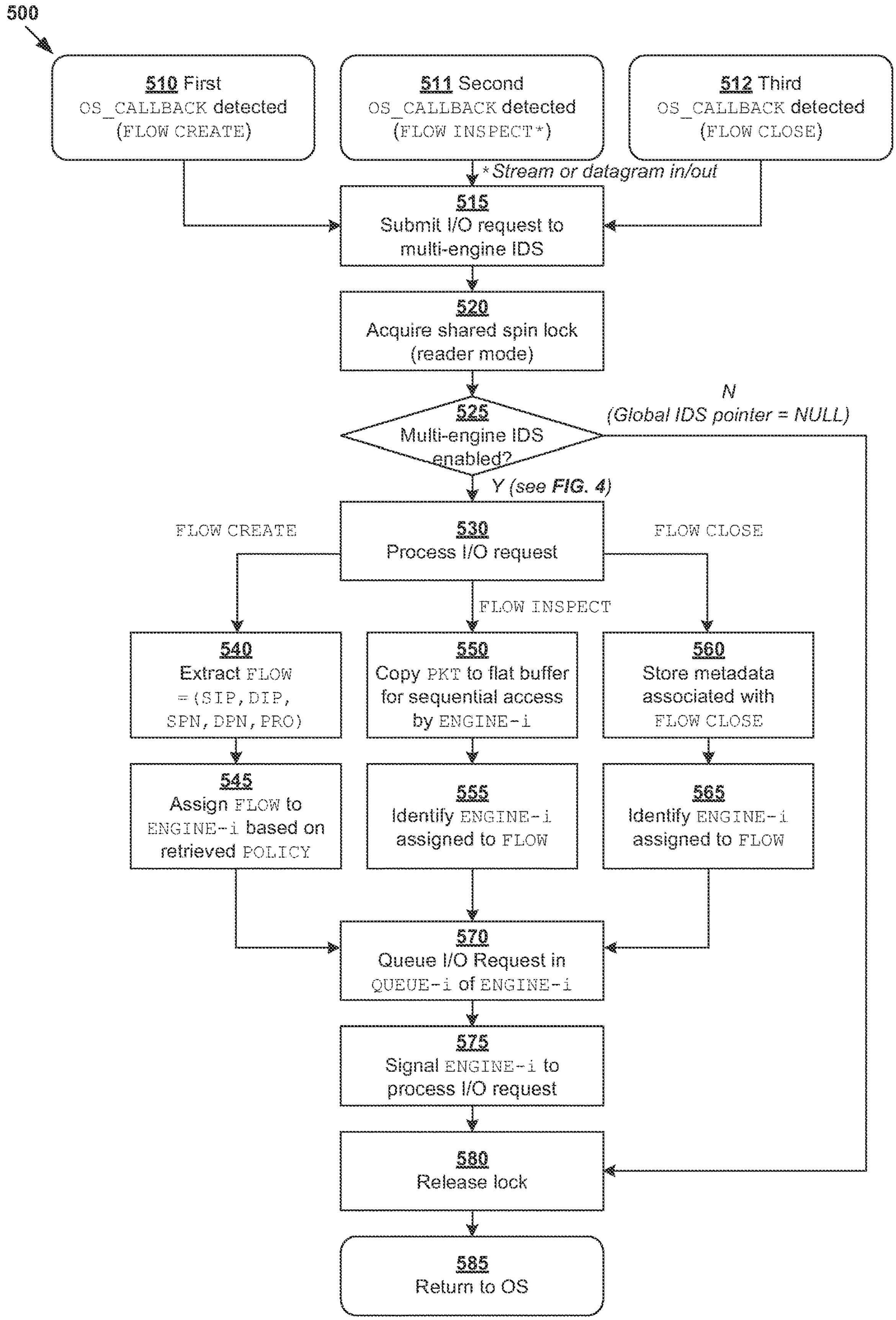
FIG. 5 is a flowchart of an example detailed process for a computer system to perform packet flow detection and IDS engine assignment.

FIG. 5 is a flowchart of example detailed process 500 for a computer system to perform packet flow detection and IDS engine assignment. Example process 500 may include one or more operations, functions, or actions illustrated at 510 to 585. The various operations, functions or actions may be combined into fewer blocks, divided into additional blocks, and/or eliminated depending on the desired implementation.

At 510-512 in FIG. 5, IDS network kernel driver 205 may detect or intercept a packet flow associated with process 203 running on endpoint 202 based on callback(s) from OS networking stack 204. At 515, based on the callback(s), IDS network kernel driver 205 may submit an I/O request to multi-engine IDS 206. At 520, a shared spin lock (reader mode) may be acquired to ensure, for example, the aliveness of software object(s) associated with IDS engine(s) for the duration of subsequent I/O request processing.

At 525 in FIG. 5, IDS network kernel driver 205 may determine whether multi-engine IDS 206 is enabled based on whether a global IDS pointer (see block 470 in FIG. 4) is not NULL (i.e., when enabled) or otherwise (i.e., NULL when disabled). At 530, if enabled, IDS network kernel driver 205 may perform I/O request processing based on the callback from OS networking stack 204 according to blocks 540-565. Three callback types will be discussed below.

(a) Callback=Packet Flow Establishment (i.e., New Connection or Session)

In a first example (see 511 in FIG. 5), IDS network kernel driver 205 may detect or intercept a request to establish or initiate a new packet flow or connection based on a first callback type (denoted as FLOW CREATE) from OS networking stack 204. At 540 in FIG. 5, in response to detecting the request, IDS network kernel driver 205 may extract relevant flow identification information (also known as connection identification information) from the new request, such as (SIP, DIP, SPN, DPN, PRO). The flow identification information is then passed onto multi-engine IDS 206 for tracking the packet flow uniquely.

At 545 in FIG. 5, multi-engine IDS 206 may assign a particular IDS engine to the packet flow based on any suitable assignment policy 240. When a packet flow is assigned to a particular IDS engine, metadata associated with the IDS engine may be stored within flow-specific kernel memory. Mapping information is generated to associate the flow identification information with the IDS engine. The mapping information may be maintained or persisted for the lifetime of the packet flow. For subsequent packet inspection, a lookup may be performed to identify a particular IDS engine assigned to a packet flow. Some example assignment policies are disclosed below with reference to first packet flow (FLOW-1), second packet flow (FLOW-2), third packet flow (FLOW-3), and so on.

According to a first policy, a round robin assignment policy may be applied where FLOW-1 is assigned to ENGINE-1 211, FLOW-2 to ENGINE-2 212, and FLOW-3 to ENGINE-3 213, FLOW-4 to ENGINE-1 211, and so on.

According to a second policy, a load-based assignment policy may be applied by assigning FLOW-1 to ENGINE-1 211 having the least amount of load (e.g., based on the number of flows assigned to that engine, number of packets or bytes to be inspected, etc.).

According to a third policy, an affinity-based assignment policy may be applied. In this case, a particular IDS engine may be assigned to a packet flow based on application affinity settings. For example, all browser network I/O may be handled or inspected using ENGINE-1 211, whereas other traffic such as remote desktop protocol (RDP), secure shell (SSH) and file transfer protocol (FTP) traffic may be inspected using ENGINE-2 212.

According to a fourth policy, a priority-based assignment policy may be applied. In this case, at least one IDS engine may be reserved for high-priority packet flows, and the remaining for other priority level(s). Packet flows may be tagged to indicate their priority level. Using three priority levels as an example, ENGINE-1 211 may be assigned to inspect packet flows associated with priority level=HIGH, ENGINE-2 212 for priority level=NORMAL or DEFAULT, and ENGINE-3 213 for priority level=LOW. In practice, any suitable number of priority levels may be defined. The priority level may be determined based protocol information of a packet flow (e.g., some protocols are more vulnerable to security threats). A network administrator may decide that a web server host prioritizes HTTPS traffic inspection above all other traffic on computer system 201. Any additional and/or alternative assignment policies may be configured (e.g., random assignment).

At 570-575 in FIG. 5, once a particular IDS engine (ENGINE-i) is assigned to a packet flow, an I/O request may be added to QUEUE-i associated with ENGINE-i as an atomic operation, and ENGINE-i signaled to process the I/O request. At 580-585, the shared spin lock acquired at block 520 is released and process 500 returns to the OS. This way, all subsequent packets may be inspected by a corresponding worker thread (THREAD-i) of ENGINE-i by accessing QUEUE-i. Note that QUEUE-i is designed to store I/O requests associated with a packet flow that requires inspection by THREAD-i. For a particular IDS engine (ENGINE-i), a single thread of execution is used to reduce the likelihood of, if not avoid, contention associated with multi-thread execution and incurring additional latencies due to synchronization locks.

(b) Callback=Packet to be Inspected

In a second example (see 512 in FIG. 5), IDS network kernel driver 205 may detect or intercept packet(s) belonging to a packet flow based on a second callback type (denoted as FLOW INSPECT in FIG. 5) from OS networking stack 204. Here, the packet(s) may be in the form of an ingress/egress stream, or ingress/egress datagram(s). At 550 in FIG. 5, based on the second callback, IDS network kernel driver 205 may copy packet data to a buffer (e.g., flat buffer) for sequential access by the assigned IDS engine (ENGINE-i).

Depending on the desired implementation, IDS network kernel driver 205 may receive or detect the second callback from OS networking stack 204 for any inbound/outbound network data transfer request with pointer or chain of buffers containing raw stream data and the length of actual buffer. Upon receiving stream or datagram data, IDS network kernel driver 205 may copy the stream or datagram packet data from buffer memory descriptor list (MDL) chain to virtually continuous linear buffer based on any alignment requirement(s) of ENGINE-i. In practice, an MDL may include an MDL structure followed by an array of data that describes the physical memory in which a buffer resides.

In practice, a lock/synchronization is generally not required to perform packet copy operation while performing inline/out of band packet inspection processing. For inline processing, however, a lock may be required to perform packet inspection serially for a packet flow. Conventionally, if the same flow processing request is received on multiple cores, then a lock may be required to maintain the order of packet inspection as well as to maintain the integrity of the inspection engine's data structures. In contrast, using examples of the present disclosure, a lock may not be required to maintain the integrity of each IDS engine's (ENGINE-i) data structures because there is a separate worker thread (THREAD-i) and no parallel execution is performed by each IDS engine. Also, a queue-specific lock is used to queue requests, which helps to maintain the order of inspecting processing requests.

At 555 in FIG. 5, IDS network kernel driver 205 may identify the assigned IDS engine (ENGINE-i) based on flow identification information extracted from the packet. At 570-575 in FIG. 5, an I/O request associated with packet inspection may be queued in QUEUE-i associated with ENGINE-i as an atomic operation, and ENGINE-i signaled to process the I/O request. At 580-585, the shared spin lock acquired at block 520 is released and process 500 returns to the OS.

(c) Callback=Packet Flow Termination (i.e., Close Connection)

In a third example (see 513 in FIG. 5), IDS network kernel driver 205 may detect or intercept a request for packet flow termination based on a third callback type (denoted as FLOW CLOSE in FIG. 5) from OS networking stack 204. At 560-565 in FIG. 5, IDS network kernel driver 205 may store metadata associated with the packet flow termination and identify ENGINE-i assigned to the packet flow. At 570-575, an I/O request may be added to QUEUE-i to notify ENGINE-i of the termination before signaling ENGINE-i to process the I/O request. At 580-585, the shared spin lock acquired at block 520 is released and process 500 returns to the OS.

Example I/O Request Processing by Multi-Engine IDS

Figure 6:
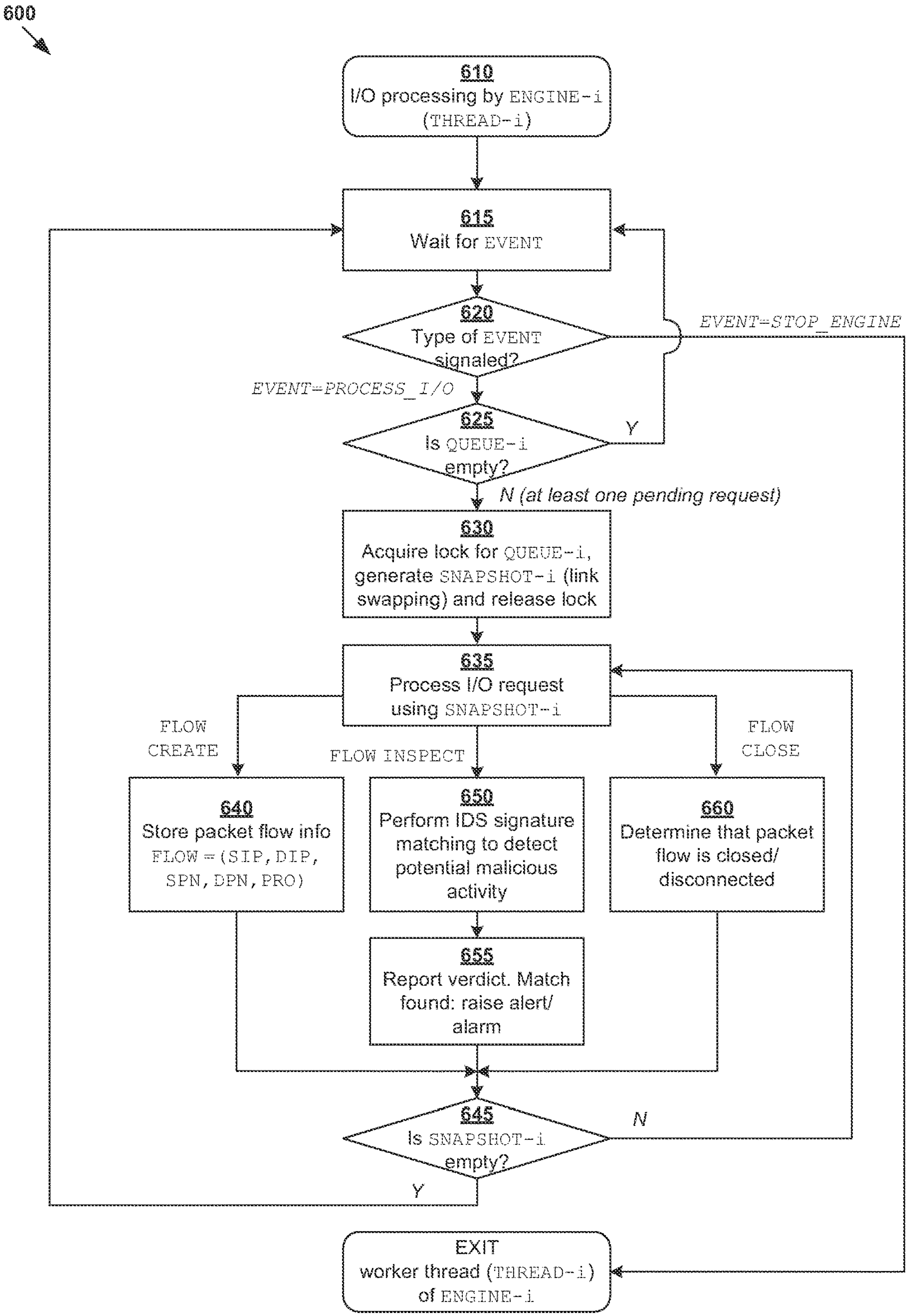
FIG. 6 is a flowchart of an example detailed process for a computer system to perform input output (I/O) request processing using a particular IDS engine of multi-engine IDS.

FIG. 6 is a flowchart of example detailed process 600 for a computer system to perform I/O request processing using a particular IDS engine (ENGINE-i) of multi-engine IDS 206. Example process 600 may include one or more operations, functions, or actions illustrated at 610 to 660. The various operations, functions or actions may be combined into fewer blocks, divided into additional blocks, and/or eliminated depending on the desired implementation.

At 610-620 in FIG. 6, a worker thread (THREAD-i) of a particular IDS engine (ENGINE-i) may be configured to monitor for events. In one example, in response to detecting event=stop or disable ENGINE-i (or its I/O request processing), the worker thread may be exited or terminated. In another example, in response to detecting event=process pending I/O request(s), THREAD-i may determine whether corresponding queue (QUEUE-i) is empty. If there is at least one pending I/O request in QUEUE-i, blocks 630-645 may be performed as follows.

At 630 in FIG. 6, THREAD-i may acquire a lock associated with QUEUE-i, generate a queue snapshot (denoted as SNAPSHOT-i) associated with QUEUE-i, and release the lock to facilitate lock-free I/O processing. Any suitable approach may be implemented for snapshot generation, such as link swapping that involves moving all queue nodes to another queue (i.e., the snapshot) by swapping links of the first and last nodes of the queue. Example link swapping for snapshot generation will be explained further below using FIG. 7.

At 635 in FIG. 6, THREAD-i may perform I/O request processing based on whether the first callback type (FLOW CREATE), second callback type (FLOW INSPECT) and third callback type (FLOW CLOSE) is received from OS networking stack 204. I/O request processing based on the callback type will be discussed below.

(a) Packet Flow Establishment

At 640 in FIG. 6, in the case of detecting an I/O request associated with a packet flow establishment (i.e., callback=FLOW CREATE at 511 in FIG. 5), THREAD-i may store flow identification information (SIP, DIP, SPN, DPN, PRO) for use during subsequent packet inspection. At 645, it is determined whether the queue snapshot (SNAPSHOT-i) is empty. If not (i.e., not empty), the process continues to block 635 where the next I/O request in SNAPSHOT-i is processed. Otherwise (i.e., empty), once all I/O requests in SNAPSHOT-i have been processed, the process continues to block 615 where the process waits for the next event=process I/O requests.

(b) Packet Inspection

At 650 in FIG. 6, in the case of detecting an I/O request associated with packet inspection (i.e., callback=FLOW INSPECT at 512 in FIG. 5), THREAD-i may perform signature matching by matching packet content to one or more signatures in IDS signature set 208 to detect whether the packet flow is potentially malicious. For inspection, multi-engine 206 may maintain an extra reference on the flow data structures to ensure that data structures representing a connection or packet flow are valid while performing asynchronous traffic inspection from that packet flow.

At 655 in FIG. 6, THREAD-i may generate and send a notification to notify IDS network kernel driver 205 of a verdict of the signature matching. If there is a match, the notification may be in the form of an alert or alarm to IDS network kernel driver 205. Again, at 645, the next batch of I/O request(s) in QUEUE-i may be processed and block 625 may be repeated.

Depending on the desired implementation, packet inspection may be performed according to an out-of-bound approach or inline approach. According to the out-of-bound approach in FIGS. 5-6, IDS network kernel driver 205 may call a particular IDS engine (ENGINE-i) assigned to a packet flow to inspect stream buffer by queuing a request in QUEUE-i as per order of arrival. The process then returns to IDS network kernel driver 205 immediately. Using this approach, the lock at block 630 is acquired for the purpose of protecting QUEUE-i of ENGINE-i, which does not affect other ENGINE-k (k≠i). This should be contrasted against conventional approaches that necessitate the use of synchronization locks while doing packet inspection on systems with multiple CPU cores.

Whenever signature matching is completed, THREAD-i of ENGINE-i may notify IDS network kernel driver 205 of the verdict, such as whether the packet flow inspected is potentially malicious (i.e., match found) or otherwise (i.e., match not found). Meanwhile, IDS network kernel driver 205 may further decide on the next steps. If IDS network kernel driver 205 is configured to inspect the stream data, it may allow the OS to continue its further processing with the stream data and ENGINE-i to perform inspection at an appropriate time. If a blocking capability is enabled, network kernel driver 205 may clone the stream data buffer or buffer chain and pend the packets. After deciding on an action based on the final verdict, IDS network kernel driver 205 may discard the pending packets or reinject the packets to the packet flow stream and free any cloned data or buffer chain. Upon receiving a verdict callback, network kernel driver 205 decide whether to report that the packet flow is potentially malicious, or perform a delayed termination of the network connection.

According to the inline approach, IDS network kernel driver 205 may signal to a particular IDS engine (ENGINE-i) to inspect stream buffer(s) associated with a packet flow assigned to ENGINE-i. Corresponding THREAD-i may perform or invoke stream inspection in a synchronous manner and notify IDS network kernel driver 205 of a signature matching verdict via a callback or by returning a predefined status code. In response to receiving the verdict, IDS network kernel driver 205 may allow the OS to continue classifying stream data further (if active data inspection is supported). Alternatively or additionally, IDS network kernel driver 205 may evaluate the verdict to either instruct OS networking stack 204 to block the packet flow or report it to a user (e.g., network administrator).

(c) Packet Flow Termination

At 660, in the case of detecting an I/O request associated with a packet flow termination (i.e., callback=FLOW CLOSE at 513 in FIG. 5), THREAD-i may determine that the packet flow is terminating, and it is not necessary to inspect any remaining packets belonging to that packet flow. In case of asynchronous processing, THREAD-i may release extra reference taken for an associated connection object and stop processing any I/O request(s) associated with the packet flow. IDS network kernel driver 205 may also remove mapping information associating the packet flow with ENGINE-i, thereby removing the assignment and making ENGINE-i available for other packet inspection workload.

(d) Example Scenario

Figure 7:
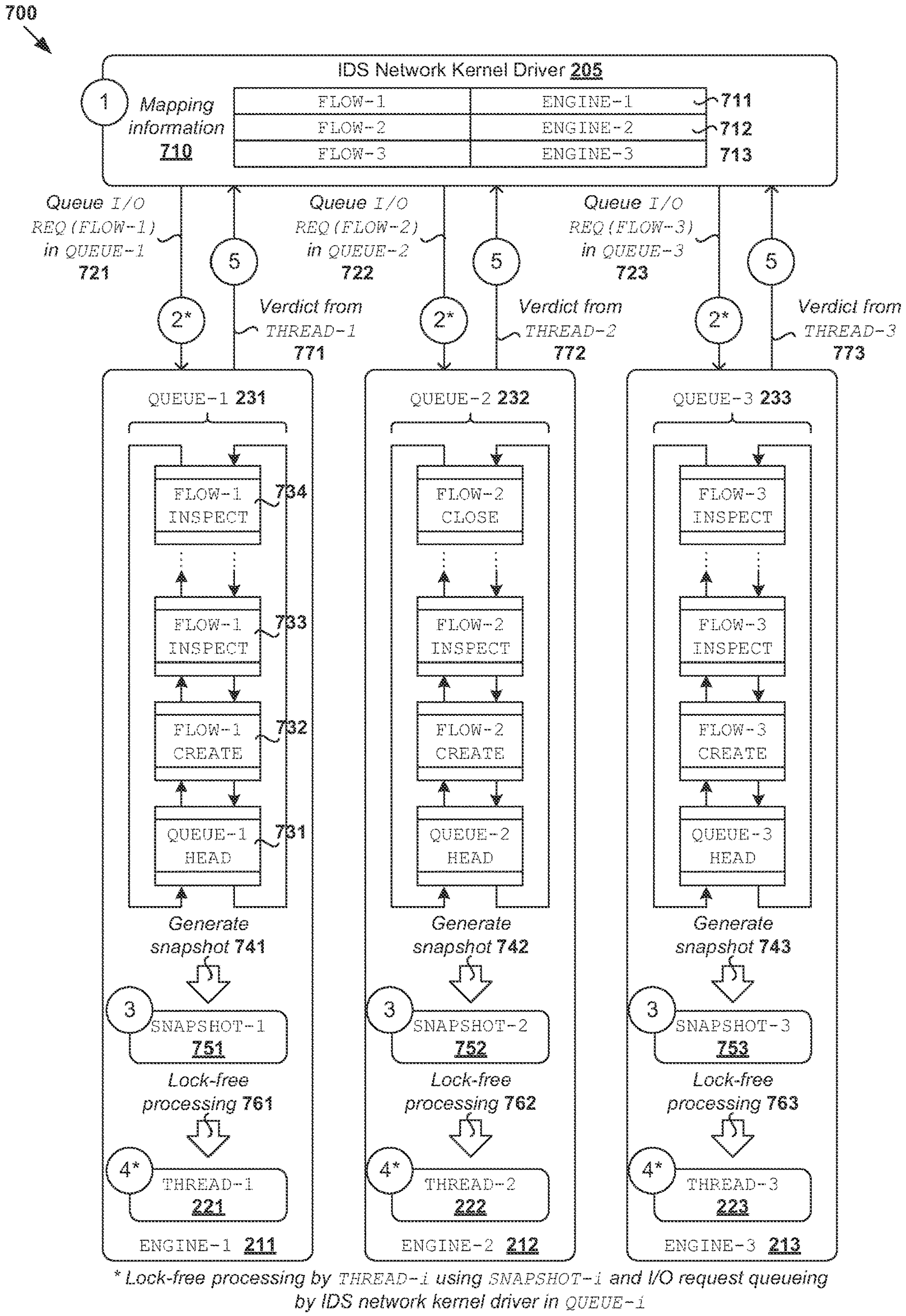
FIG. 7 is a schematic diagram of an example packet flow inspection using multiple IDS engines in a substantially lock-free manner.

Some examples are shown in FIG. 7, which is a schematic diagram of example packet flow inspection using multiple IDS engines. In this example, N=3 IDS engines are configured and assigned with different packet flows for inspection. In particular, at 711-713 in FIG. 7, a packet flow denoted as FLOW-1 is assigned to ENGINE-1 211, FLOW-2 to ENGINE-2 212, and FLOW-3 to ENGINE-3 213. IDS network kernel driver 205 and multi-engine IDS 206 may store mapping information 710 associated with the assignment. Additional flow(s) may be assigned to ENGINE-i where i∈[1, . . . , N] according to any suitable assignment policy, such as FLOW-4 to ENGINE-2 212, FLOW-5 to ENGINE-1 211, etc.

In relation to FLOW-1 assigned to ENGINE-1 211, IDS network kernel driver 205 may queue first I/O requests associated with FLOW-1 in QUEUE-1 231 of ENGINE-1 211 (see 721 in FIG. 7). In practice, QUEUE-1 231 may be implemented using any suitable data structure, such as a doubly linked list, etc. In general, a doubly linked list may include a set of linked nodes (also called records). Each node may include three fields: a backward link that points to a previous node, a data field, and a forward link that points to a next node. In the example in FIG. 7, QUEUE-1 231 may include a head node (see 731), a second node that stores an I/O request associated with the establishment of FLOW-1 (see 732), and multiple nodes that each store an I/O request associated with packet inspection of FLOW-1 (see 733-734). Last node 734 and head node 731 of QUEUE-1 231 are connected via backward and forward links.

When I/O request queueing in ENGINE-i for i∈[1, . . . , N] is required, IDS network kernel driver 205 may acquire a queue-specific lock associated with QUEUE-i, queue the I/O request in QUEUE-i and release the lock once queueing is completed according blocks 520-580 in FIG. 5. However, in practice, lock contention may arise when worker thread (THREAD-i) attempts to access QUEUE-i at the same time as IDS network kernel driver 205. In this case, THREAD-i may try to acquire the same lock, which is required to process I/O request(s) stored in QUEUE-i by removing a node from QUEUE-i. In this case, lock synchronization may be required, which may in turn affect performance in terms of I/O processing rate.

To avoid or reduce the likelihood of lock contention for processing each I/O request from QUEUE-i, THREAD-i may generate and store a snapshot of QUEUE-i (denoted as SNAPSHOT-i). This way, IDS network kernel driver 205 may queue I/O request(s) in the original QUEUE-i while THREAD-i is free to process I/O request(s) in SNAPSHOT-i without using any lock. This lock-free processing approach may also facilitate batch processing of I/O request(s).

To generate SNAPSHOT-i of QUEUE-i in the form of a doubly linked list, THREAD-i may acquire a lock to the original QUEUE-i and perform link swapping as follows (see also block 630 in FIG. 6). First, THREAD-i may detach a forward link of QUEUE-i's head node and attach it to a forward link of SNAPSHOT-i's head node. Second, THREAD-i may detach a backward link of QUEUE-i's head node and attach it to a backward link of SNAPSHOT-i's head node. Next, a backward link of SNAPSHOT-i's second node and the forward link of SNAPSHOT-i's last node may be adjusted such that they point to SNAPSHOT-i's head node. Finally, the lock to QUEUE-i may be released, after which IDS network kernel driver 205 is free to acquire the lock to queue more I/O request(s).

In the example in FIG. 7, SNAPSHOT-1 may be generated by THREAD-1 based on QUEUE-1 (see 741-761) to facilitate lock-free I/O request processing. Similarly, SNAPSHOT-2 may be generated by THREAD-2 based on QUEUE-2 (see 742-752), and SNAPSHOT-3 by THREAD-3 based on QUEUE-3 (see 743-753). At the end of snapshot generation, QUEUE-i may be accessed by IDS network kernel driver 205 to queue more I/O request(s) while SNAPSHOT-i may be used by THREAD-i for I/O request processing simultaneously (i.e., lock synchronization is not required).

Once I/O request(s) in SNAPSHOT-i have been processed in a lock-free manner, THREAD-i may provide a verdict (see 771-773) to IDS network kernel driver 205. Further, THREAD-i may repeat the snapshot generation steps to take another snapshot for the next batch of I/O request(s). Note that worker threads 221-223 may perform snapshot generation and lock-free I/O request processing independently at any suitable frequency.

Dynamic Scaling

According to examples of the present disclosure, dynamic scaling of N=number of IDS engines may be performed based on any suitable scaling policy. Some examples will be explained using FIG. 8, which is a schematic diagram of an example dynamic scaling of multi-engine IDS 206. To facilitate dynamic scaling, IDS network kernel driver 205 and/or multi-engine IDS 206 may collect any metric information (denoted as METRIC-i) associated with each ENGINE-i for i=[1, . . . , N], such as number of bytes scanned, number of I/O requests in QUEUE-i (e.g., per protocol), total number of I/O requests assigned per ENGINE-i, scan latency per ENGINE-i, number of active flows assigned to ENGINE-i, idle time associated with ENGINE-i, any combination thereof, etc. See 810 in FIG. 8.

Metric information 810 may be collected at any suitable check point(s). For example, queuing-related metric information may be collected when queueing I/O request(s) in QUEUE-i. Scan latency and number of bytes scanned may be collected during packet inspection by THREAD-i. Here, metric information 810 may indicate the amount of inbound/outbound network traffic load, outstanding number of packets or bytes across all IDS engines, etc. Metric information 810 may be collected to facilitate automatic scaling by computer system 201, endpoint 202 (e.g., IDS network kernel driver 205 and/or multi-engine IDS 206) or management entity 170/172. Additionally and/or alternatively, manual scaling may be performed by a user (e.g., network administrator) based on metric information 810.

During dynamic scaling, an IDS engine may be added or removed based on metric information 810 as well as system resource information, such as CPU consumption, memory consumption, number of CPU cores accessible by endpoint 201, etc. For example, if a scaling policy specifies that multi-engine IDS should only consume X percentage (e.g., 20%) of total CPU, N may be increased or decreased based on the current CPU consumption. In another example, if the scaling policy is configured to prioritize multi-engine IDS over CPU or memory consumption, then N may be increased to speed up packet inspection. In a further example, in response to detecting that the number of outstanding packets or bytes to be inspected exceeds a predefined threshold, the assignment of a particular packet flow may be transferred or migrated from one IDS engine to another IDS engine with lower load. Any additional and/or alternative scaling policy may be implemented in practice.

Figure 8:
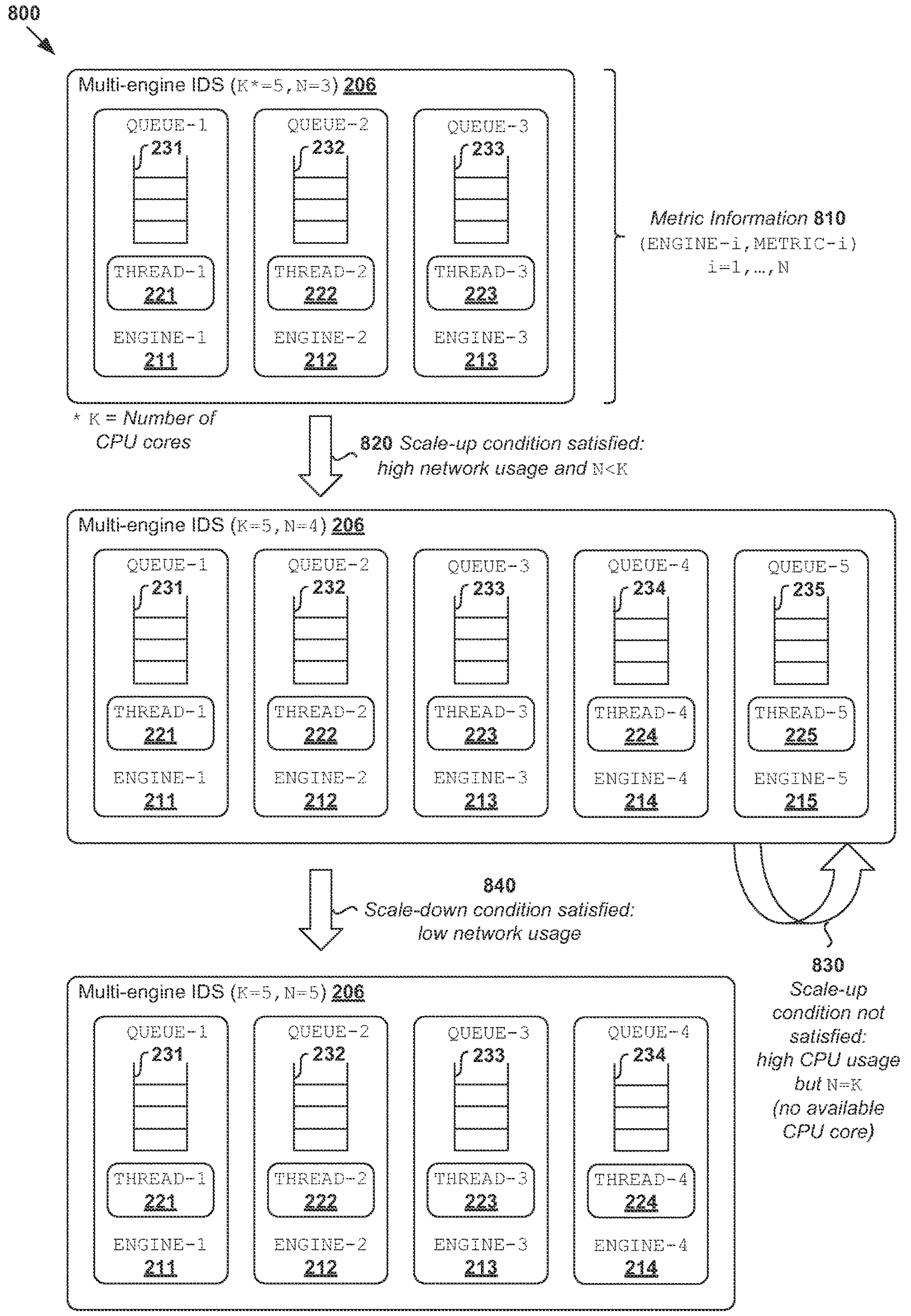
FIG. 8 is a schematic diagram of an example dynamic scaling of a multi-engine IDS.

Some example scenarios are shown in FIG. 8. At 820 in FIG. 8, a first scenario with high network usage is shown, where N IDS engines are associated with a high workload status (e.g., number of incoming I/O requests in a queue is higher than the queue's throttling rate). In response to determination that a scale-up condition is satisfied, N may be increased based on system resource information (e.g., CPU and/or system memory availability). Using K=number of CPU cores and N<K, N may be increased or scaled up. In the example in FIG. 8, since K=5 and N=3, N may be increased to, say, N=5, thereby expanding the set of multiple IDS engines 210 (see 213-214, 223-224, 233-234).

At 830 in FIG. 8, a second scenario with high CPU usage is shown, where CPU usage or exceeds a predetermined threshold (e.g., 100% hike in CPU usage). To alleviate the high CPU usage, N may be increased based on system resource availability (e.g., CPU and/or system memory availability). In this case, however, since K=5 and N=5 (i.e., there is no available CPU code), N cannot be scaled up and it is determined that a scale-up condition is not satisfied.

At 840 in FIG. 8, a third scenario with low network usage is shown, where N IDS engines are associated with a low workload status (e.g., idle time associated with ENGINE-i exceeds a predetermined threshold for a threshold time). In response to determination that a scale-down condition is satisfied, N may be decreased by disabling at least one ENGINE-i with substantially long idle time. Scaling down helps to free associated system resources to maintain ENGINE-i, and make the system resources available for the rest of the system. See FIG. 9 for examples.

Disabling Multi-Engine IDS

Figure 9:
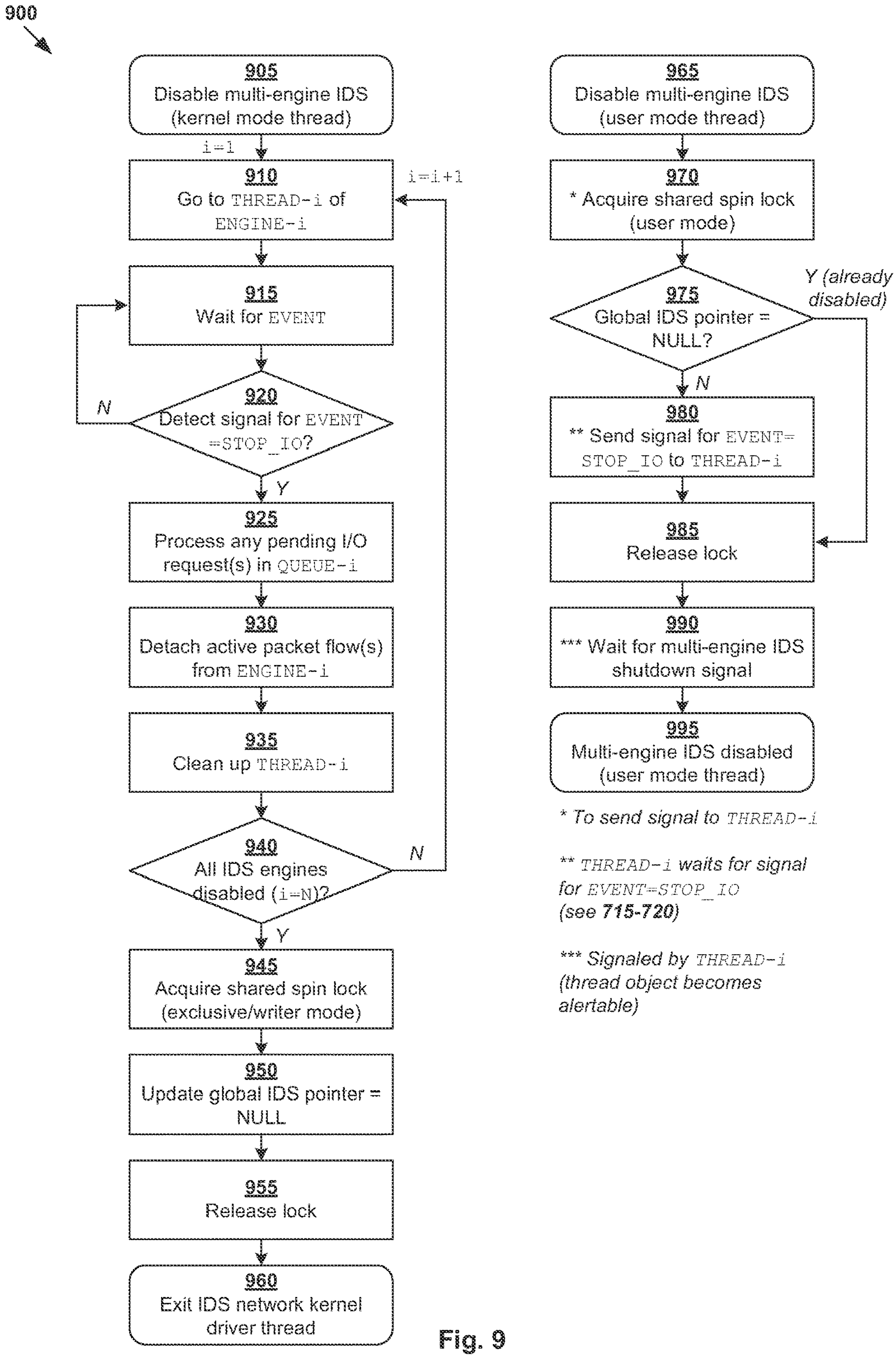
FIG. 9 is a flowchart of an example detailed process for a computer system to disable multi-engine IDS.

FIG. 9 is a flowchart of an example detailed process for a computer system to disable multi-engine IDS. Example process 900 may include one or more operations, functions, or actions illustrated at 905 to 995. The various operations, functions or actions may be combined into fewer blocks, divided into additional blocks, and/or eliminated depending on the desired implementation. Kernel mode operations will be explained using blocks 905-960, and user mode operations using blocks 965-995.

In relation to kernel mode operations, each THREAD-i associated with ENGINE-i may wait for a signal for an event to stop all I/O processing. In response to detecting the signal, any pending I/O requests in QUEUE-i may be processed, and active packet flows detached from ENGINE-i (i.e., assignment removed). Any additional cleanup operation(s) may be performed for THREAD-i. This is repeated for any remaining IDS engines that have not been disabled. Once all are disabled, a shared spin lock (exclusive/writer mode) may be acquired to set a global IDS pointer to NULL. The lock is then released and a thread on IDS network kernel driver 205 may be exited or stopped. See blocks 905-960 in FIG. 9.

In relation to user mode operations, a user mode thread may be executed to disable multi-engine IDS. In the example in FIG. 9, a shared spin lock (user mode) may be acquired to send signal to THREAD-i associated with ENGINE-i to stop all I/O processing (see related blocks 915-920 in kernel mode). The shared spin lock is then released. The user mode thread may then wait for a signal indicating that all IDS engines have been disabled before the thread is exited. See blocks 965-995 in FIG. 9.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 9, container technologies may be used to run various containers inside respective VMs 131-134. Containers are "OS-less", meaning that they do not include any OS that could weigh 10*s* of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 9. For example, the instructions or program code, when executed by the processor of the computer system, may cause the processor to implement examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-unit.

The invention claimed is:

1. A method for a computer system to perform multi-engine intrusion detection, wherein the method comprises:

configuring a set of multiple intrusion detection system (IDS) engines that include at least a first IDS engine and a second IDS engine;

in response to detecting an establishment of a first packet flow associated with an endpoint, assigning the first packet flow to the first IDS engine based on an assignment policy;

in response to detecting an establishment of a second packet flow associated with the endpoint, assigning the second packet flow to the second IDS engine based on the assignment policy;

performing, using the first IDS engine, first packet flow inspection to determine whether one or more first packets associated with the first packet flow are potentially malicious based on a set of IDS signatures; and performing, using the second IDS engine, second packet flow inspection to determine whether one or more second packets associated with the second packet flow are potentially malicious based on the set of IDS signatures, wherein configuring the set of multiple IDS engines comprises at least one of the following:

configuring the first IDS engine to include (a) a first queue to store one or more first requests associated with the first packet flow inspection, and (b) a first worker thread to process the one or more first requests; and configuring the second IDS engine to include (a) a second queue to store one or more second requests associated with the second packet flow inspection, and (b) a second worker thread to process the one or more second requests, and wherein performing the first packet flow inspection using the first IDS engine comprises:

acquiring a first lock associated with the first queue that stores the one or more first requests associated with the first packet flow;

generating a first snapshot associated with the first queue, wherein the first snapshot stores the one or more first requests;

releasing the first lock associated with the first queue; and processing the one or more first requests in the first snapshot in a substantially lock-free manner.

2. The method of claim 1, further comprising at least one of the following:

in response to detecting the one or more first packets associated with the first packet flow, the network kernel driver acquiring a first lock associated with the first queue to queue the one or more first requests in the first queue; and in response to detecting the one or more second packets associated with the second packet flow, the network kernel driver acquiring a second lock associated with the second queue to queue the one or more second requests in the second queue.

3. The method of claim 1, wherein the method further comprises:

monitoring metric information associated with the set of multiple IDS engines; and based at least on the metric information, performing dynamic scaling of the set of multiple IDS engines to increase or decrease a size of the set of multiple IDS engines.

4. The method of claim 3, wherein performing dynamic scaling comprises at least one of the following:

in response to determination that a scale-up condition is satisfied based on the metric information and system resource availability, increasing the size by adding at least one further IDS engine to the set of multiple IDS engines; and in response to determination that a scale-down condition is satisfied based on the metric information and system resource availability, decreasing the size by removing at least one of the multiple IDS engines from the set.

5. The method of claim 1, wherein assigning the first packet flow to the first IDS engine or the second packet flow to the second IDS engine comprises:

retrieving the assignment policy that is configured based on one of the following: round robin policy, load-based policy, application-affinity-based policy, and priority-based policy.

6. The method of claim 1, wherein processing the one or more first requests in the substantially lock-free manner comprises processing the one or more first requests from the first snapshot while additional requests associated with the first packet flow are queued in the first queue.

7. A non-transitory computer-readable storage medium that includes a set of instructions which, in response to execution by a processor of a computer system, cause the processor to perform a method of multi-engine intrusion detection, wherein the method comprises:

configuring a set of multiple intrusion detection system (IDS) engines that include at least a first IDS engine and a second IDS engine;

in response to detecting an establishment of a first packet flow associated with an endpoint, assigning the first packet flow to the first IDS engine based on an assignment policy;

in response to detecting an establishment of a second packet flow associated with the endpoint, assigning the second packet flow to the second IDS engine based on the assignment policy;

performing, using the first IDS engine, first packet flow inspection to determine whether one or more first packets associated with the first packet flow are potentially malicious based on a set of IDS signatures; and performing, using the second IDS engine, second packet flow inspection to determine whether one or more second packets associated with the second packet flow are potentially malicious based on the set of IDS signatures, wherein configuring the set of multiple IDS engines comprises at least one of the following:

configuring the first IDS engine to include (a) a first queue to store one or more first requests associated with the first packet flow inspection, and (b) a first worker thread to process the one or more first requests; and configuring the second IDS engine to include (a) a second queue to store one or more second requests associated with the second packet flow inspection, and (b) a second worker thread to process the one or more second requests, and wherein performing the first packet flow inspection using the first IDS engine comprises:

acquiring a first lock associated with the first queue that stores the one or more first requests associated with the first packet flow;

generating a first snapshot associated with the first queue, wherein the first snapshot stores the one or more first requests;

releasing the first lock associated with the first queue; and processing the one or more first requests in the first snapshot in a substantially lock-free manner.

8. The non-transitory computer-readable storage medium of claim 7, wherein the method further comprises at least one of the following:

in response to detecting the one or more first packets associated with the first packet flow, a network kernel driver acquiring a first lock associated with the first queue to queue the one or more first requests in the first queue; and in response to detecting the one or more second packets associated with the second packet flow, the network kernel driver acquiring a second lock associated with the second queue to queue the one or more second requests in the second queue.

9. The non-transitory computer-readable storage medium of claim 7, wherein the method further comprises:

monitoring metric information associated with the set of multiple IDS engines; and based at least on the metric information, performing dynamic scaling of the set of multiple IDS engines to increase or decrease a size of the set of multiple IDS engines.

10. The non-transitory computer-readable storage medium of claim 9, wherein performing dynamic scaling comprises at least one of the following:

in response to determination that a scale-up condition is satisfied based on the metric information and system resource availability, increasing the size by adding at least one further IDS engine to the set of multiple IDS engines; and in response to determination that a scale-down condition is satisfied based on the metric information and system resource availability, decreasing the size by removing at least one of the multiple IDS engines from the set.

11. The non-transitory computer-readable storage medium of claim 7, wherein assigning the first packet flow to the first IDS engine or the second packet flow to the second IDS engine comprises:

retrieving the assignment policy that is configured based on one of the following: round robin policy, load-based policy, application-affinity-based policy, and priority-based policy.

12. The non-transitory computer-readable storage medium of claim 7, wherein processing the one or more first requests in the substantially lock-free manner comprises processing the one or more first requests from the first snapshot while additional requests associated with the first packet flow are queued in the first queue.

13. A computer system capable of performing multi-engine intrusion detection that includes at least a first intrusion detection system (IDS) engine and a second IDS engine, wherein the computer system is configured to:

in response to detecting an establishment of a first packet flow associated with an endpoint, assign the first packet flow to a first IDS engine based on an assignment policy; and in response to detecting an establishment of a second packet flow associated with the endpoint, assign the second packet flow to a second IDS engine based on the assignment policy;

perform first packet flow inspection using the first IDS engine to determine whether one or more first packets associated with the first packet flow are potentially malicious based on a set of IDS signatures; and perform second packet flow inspection using the second IDS engine to determine whether one or more second packets associated with the second packet flow are potentially malicious based on the set of IDS signatures, wherein the first IDS engine is configured to include (a) a first queue to store one or more first requests associated with the first packet flow inspection, and (b) a first worker thread to process the one or more first requests, and the second IDS engine is configured to include (a) a second queue to store one or more second requests associated with the second packet flow inspection, and (b) a second worker thread to process the one or more second requests, and the first IDS engine is configured to perform the first packet flow inspection by performing the following:

acquiring a first lock associated with the first queue that stores the one or more first requests associated with the first packet flow;

generating a first snapshot associated with the first queue, wherein the first snapshot stores the one or more first requests;

releasing the first lock associated with the first queue; and processing the one or more first requests in the first snapshot in a substantially lock-free manner.

14. The computer system of claim 13, wherein the computer system further comprises a network kernel driver configured to:

in response to detecting the one or more first packets associated with the first packet flow, acquire a first lock associated with the first queue to queue the one or more first requests in the first queue; and in response to detecting the one or more second packets associated with the second packet flow, acquire a second lock associated with the second queue to queue the one or more second requests in the second queue.

15. The computer system of claim 13, wherein the computer system is further configured to:

monitor metric information associated with a set of multiple IDS engines including the first and second IDS engines; and based at least on the metric information, perform dynamic scaling of the set of multiple IDS engines to increase or decrease a size of the set of multiple IDS engines.

16. The computer system of claim 15, wherein the computer system is configured to perform dynamic scaling by performing at least one of the following:

in response to determination that a scale-up condition is satisfied based on the metric information and system resource availability, adding at least one further IDS engine to the set of multiple IDS engines; and in response to determination that a scale-down condition is satisfied based on the metric information and system resource availability, removing at least one of the multiple IDS engines from the set.

17. The computer system of claim 13, wherein the computer system is configured to assign the first packet flow to the first IDS engine or the second packet flow to the second IDS engine by performing the following:

retrieving the assignment policy that is configured based on one of the following: round robin policy, load-based policy, application-affinity-based policy, and priority-based policy.

18. The computer system of claim 13, wherein processing the one or more first requests in the substantially lock-free manner comprises processing the one or more first requests from the first snapshot while additional requests associated with the first packet flow are queued in the first queue.

* * * * *